United States Patent
Sugano et al.

(10) Patent No.: US 10,125,317 B2
(45) Date of Patent: Nov. 13, 2018

(54) INSOLUBILIZING MATERIAL FOR SPECIFIC HAZARDOUS SUBSTANCE AND METHOD FOR INSOLUBILIZING SPECIFIC HAZARDOUS SUBSTANCE WITH SAME

(71) Applicant: YOSHINO GYPSUM Co., Ltd., Tokyo (JP)

(72) Inventors: Kenichi Sugano, Tokyo (JP); Shinichi Miura, Tokyo (JP); Yusuke Ichino, Tokyo (JP); Masaru Yoshida, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 220 days.

(21) Appl. No.: 14/917,472

(22) PCT Filed: Oct. 27, 2014

(86) PCT No.: PCT/JP2014/078454
§ 371 (c)(1),
(2) Date: Mar. 8, 2016

(87) PCT Pub. No.: WO2015/064522
PCT Pub. Date: May 7, 2015

(65) Prior Publication Data
US 2016/0222291 A1 Aug. 4, 2016

(30) Foreign Application Priority Data
Oct. 28, 2013 (JP) .................................. 2013-223491

(51) Int. Cl.
*B09B 1/00* (2006.01)
*C09K 17/08* (2006.01)
(Continued)

(52) U.S. Cl.
CPC ............... *C09K 17/08* (2013.01); *B09C 1/08* (2013.01); *B09B 3/0041* (2013.01); *B09C 2101/00* (2013.01)

(58) Field of Classification Search
CPC ....................................................... B09C 1/08
See application file for complete search history.

(56) References Cited

U.S. PATENT DOCUMENTS 5,037,479 A * 8/1991 Stanforth ................. A62D 3/33
 405/129.25
5,859,306 A * 1/1999 Stanforth ................. A62D 3/33
 405/128.5
(Continued)

FOREIGN PATENT DOCUMENTS

JP 57140699 8/1982
JP 09122620 5/1997
(Continued)

OTHER PUBLICATIONS

Translation of JP2010207659.*
(Continued)

*Primary Examiner* — Janine M Kreck
(74) *Attorney, Agent, or Firm* — Hamre, Schumann, Mueller & Larson, P.C.

(57) ABSTRACT

The present invention intends to provide a practically valuable insolubilizing material for a designated hazardous substance (a heavy metal or the like) and an insolubilization method using the insolubilizing material for a designated hazardous substance, the insolubilizing material and method: making it possible to conduct treatment in a neutral region from start to finish to effectively insolubilize and immobilize a heavy metal or the like, which is contained in soil and the vicinity of the surface of the soil and which has adverse effects on health, by adding the insolubilizing material to the soil to mix with the soil, or spraying the insolu-
(Continued)

bilizing material on the soil; and making the treated matter reusable, environmentally friendly, and neutral without fail. In order to achieve the purpose, the present invention provides an insolubilizing material for a designated hazardous substance, making it possible to conduct treatment to soil so that the soil does not reach a strongly basic region of a pH of 11 or more from start to finish, the insolubilizing material containing: a water-soluble aluminum compound not being strongly basic and not being amorphous; and at least one concomitant component selected from the group consisting of calcium compounds, magnesium compounds, and phosphate compounds each not being strongly basic.

11 Claims, 1 Drawing Sheet

(51) Int. Cl.
*B09C 1/08* (2006.01)
*B09B 3/00* (2006.01)

(56) References Cited

U.S. PATENT DOCUMENTS 8,940,958 B2 * 1/2015 McLaughlin ......... B09B 3/0041
210/633

2007/0213577 A1 * 9/2007 Forrester ................... B09B 3/00
588/256
2013/0115004 A1 * 5/2013 Yoshi ....................... B03C 1/01
405/128.7

FOREIGN PATENT DOCUMENTS

| | | |
|---|---|---|
| JP | 2001314871 | 11/2001 |
| JP | 2003-236521 | 8/2003 |
| JP | 2004043698 | 2/2004 |
| JP | 2006233018 | 9/2006 |
| JP | 2007330884 | 12/2007 |
| JP | 2010207659 | 9/2010 |
| JP | 2012092180 | 5/2012 |
| JP | 2013031796 | 2/2013 |
| WO | 93/16797 | 9/1993 |

OTHER PUBLICATIONS

Korean Office Action, issued in the corresponding Korean patent application No. 10-2016-7008447, dated Apr. 3, 2017, 9 pages.
International Search Report issued in the corresponding International PCT application No. PCT/JP2014/078454, dated Jan. 27, 2015, 5 pages.
Extended European Search Report, issued in the corresponding European patent application No. 14859174.6, dated Apr. 25, 2017, 7 pages.

* cited by examiner

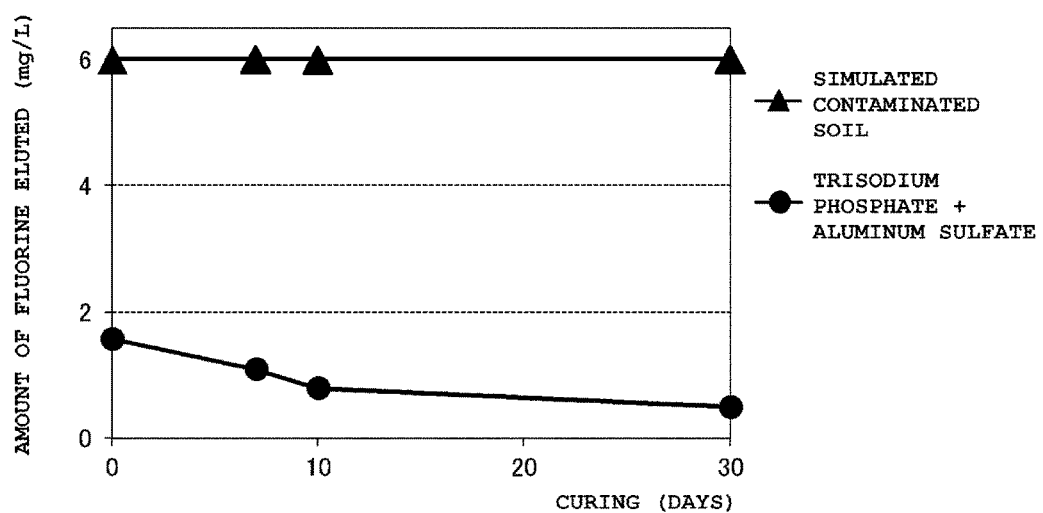

INSOLUBILIZING MATERIAL FOR SPECIFIC HAZARDOUS SUBSTANCE AND METHOD FOR INSOLUBILIZING SPECIFIC HAZARDOUS SUBSTANCE WITH SAME

TECHNICAL FIELD

The present invention relates to an insolubilizing material for a designated hazardous substance (also referred to as "heavy metal or the like" although the details will be mentioned later) and, in more detail, to an insolubilizing material for a designated hazardous substance, making it possible to conduct treatment to soil so that the soil does not reach a strongly basic region of a pH of 11 or more (hereinafter, sometimes referred to as "treat soil in a neutral region" or "treat soil in a neutral region to a weakly basic region") from start to finish, thereby insolubilizing a heavy metal or the like contained in the soil etc., and the present invention also relates to a method for insolubilizing a designated hazardous substance using the insolubilizing material for a designated hazardous substance.

BACKGROUND ART

Contaminated soil that is contaminated by a heavy metal or the like may exist at, for example, abolished plant sites that have been in operation since the times when the health hazards due to the heavy metal or the like were not recognized. Moreover, the heavy metal or the like may also be contained in surplus soil for landfill, which is attributable to the contaminated soil. In recent years, it has become known that the heavy metal or the like contained in such soil elutes and intrudes into ground water to cause a situation where human health is threatened, and the importance of the technology to stably immobilize the heavy metal or the like in soil has been recognized. It is desired that the surplus soil used for landfill be neutral (specifically, pH of 5.0 to 9.0) from environmental consideration, however since strongly basic soil as a result of being mixed with mortar is frequently discharged, the surplus soil for landfill is basic in many cases. Furthermore, the surplus soil used for landfill has a high water content in many cases, such as a large amount of sludge that is produced by waste water treatment and water-containing mud including surplus soil waste from construction, and when such soil is used for landfill, it becomes necessary to solidify mud in many cases.

As mentioned previously, from the necessity for preventing the elution of the heavy metal or the like from the soil at abolished plant sites etc. or from the soil filled up with surplus soil and the intrusion of the heavy metal or the like into ground water, various types of insolubilizing materials for a heavy metal or the like have conventionally been used for the purpose of suppressing the elution of the heavy metal or the like, and the effects thereof have been confirmed. It is to be noted that the "heavy metal or the like" in the present invention means the "Heavy Metal or the like being Designated Hazardous Substance (class II designated hazardous substance)" specified in Article 2 of Soil Contamination Countermeasures Act that came into effect in 2003, and specifically denotes the following compounds.

Cadmium and compounds thereof
Hexavalent chromium compounds
Cyanides
Mercury and compounds thereof (including alkyl mercury compounds)
Selenium and compounds thereof
Lead and compounds thereof
Arsenic and compounds thereof
Fluorine and compounds thereof
Boron and compounds thereof.

As mentioned previously, various proposals have been made for the purpose of insolubilizing the heavy metal or the like contained in soil, and also have been put into practical use. For example, as a technology for making fluorine hardly soluble to stabilize against fluorine-contaminated soil or the like, a method for making fluorine hardly soluble to stabilize by producing fluorinated apatite and ettringite with a material containing gypsum, lime, ferrous sulfate, and a phosphate compound is proposed (see Patent Literature 1). Moreover, there is also a proposal (see Patent Literature 2) on a technology in which the heavy metal or the like is insolubilized by producing ettringite making use of a solidifying material composition comprising cement, aluminum sulfate, and gypsum. Furthermore, the present applicant also has so far made a proposal (see Patent Literature 3) on a gypsum-based insolubilizing and solidifying material for a heavy metal or the like: that makes it possible to make the treated matter after treatment neutral; and that makes it possible to solidify a heavy metal or the like contained in mud concurrently with insolubilizing the heavy metal or the like to impart the strength to the mud, thereby making the mud excellent in handling, by using the gypsum-based insolubilizing and solidifying material for a heavy metal or the like added to and mixed with the sludge produced by waste water treatment or the mud such as surplus soil waste from construction. Specifically, the proposal has been made on an insolubilizing and solidifying material for a heavy metal or the like in which an aluminum compound selected from aluminum hydroxide and so on and a neutralizing agent containing a calcium or magnesium component are contained in calcined gypsum.

Many of the heavy metal-insolubilizing materials that have conventionally been known use a strongly basic material, or a mixture of a strongly basic material and an acidic material, and therefore the treated matter during the treatment process exhibits a strong basicity, however, in a table test, the treated matter that is to be finally obtained becomes neutral because contact with air can be made and favorable mixing among materials can be conducted (see Patent Literature 4).

CITATION LIST

Patent Literature

Patent Literature 1: Japanese Patent Laid-Open No. 2007-330884
Patent Literature 2: Japanese Patent Laid-Open No. 57-140699
Patent Literature 3: Japanese Patent Laid-Open No. 2010-207659
Patent Literature 4: Japanese Patent Laid-Open No. 2004-043698

SUMMARY OF INVENTION

Technical Problem

However, according to the studies conducted by the present inventors, there occurs a problem that the soil after treatment exhibits basicity in the actual construction sites because the contact area of the treated matter with the air is extremely limited and materials are not well mixed. For example, in the previously described technology disclosed in Patent Literature 3, the pH of the soil during the treatment is made to be basic, as high as 11 or more, so as to produce ettringite by using cement as a main component, and in the technology, it is essential to make the soil strongly basic so that the pH of the soil is 11 or more during the treatment. Accordingly, also in such a case, the problem that the soil after treatment exhibits basicity, which often occurs in actual construction sites, is unavoidable, and it is difficult to make the treated matter after treatment (hereinafter, sometimes simply referred to as "treated matter") neutral without fail.

Ettringite is an expansible material, and therefore when landfill treatment or the like of treated matters is conducted, there occurs another problem of upheaval of landfill sites with elapse of time, such as so-called secondary expansion or heaving.

Furthermore, it is desirable that not only treatment with inexpensive materials be possible but also large scale mixing treatment of the soil with an insolubilizing material for a heavy metal or the like be made unnecessary from the standpoint of developing a more inexpensive and surer treatment method for insolubilizing a heavy metal or the like. It is considered that the heavy metal or the like exists much particularly in the vicinity of the surface of the contaminated soil at abolished plant sites and so on, and therefore an insolubilizing material for a heavy metal or the like that makes it possible to simply immobilize the heavy metal or the like by just spraying and applying the insoluble material on the surface of the soil is extremely useful when developed. Furthermore, since mud with a high water content is frequently treated, it becomes necessary to improve the handling property by solidifying the mud in some cases, however also in such cases, capability of conducting treatment in a neutral region and neutral treated matters are desired.

Accordingly, the present invention intends to provide a high performance insolubilizing material for a designated hazardous substance (heavy metal or the like) with which the problems of the above-described conventional technologies can be solved. That is to say, the present invention intends to provide an insolubilizing material for a designated hazardous substance (heavy metal or the like) which is used in insolubilization treatment conducted by adding the insolubilizing material to the soil to mix with the soil or insolubilization treatment conducted by spraying the insolubilizing material on the surface of the soil, the insolubilizing material comprising an economical material using inexpensive raw materials that are easily available. Furthermore, the present invention intends to provide a practically valuable insolubilizing material for a designated hazardous substance (a heavy metal or the like): making it possible to conduct treatment in a neutral region to a weakly basic region from start to finish to effectively insolubilize and immobilize a heavy metal or the like which is contained in the soil and the vicinity of the surface of the soil and which has adverse effects on health; and making the treated matter reusable, environmentally friendly, and neutral (pH of 5.0 to 9.0) without fail even when a solidifying material is used.

Solution to Problem

The above-described purpose is achieved by the present invention below. That is to say, the present invention provides an insolubilizing material for a designated hazardous substance, making it possible to conduct treatment to soil so that the soil does not reach a strongly basic region of a pH of 11 or more from start to finish, the insolubilizing material containing: a water-soluble aluminum compound not being strongly basic and not being amorphous; and at least one concomitant component selected from the group consisting of calcium compounds, magnesium compounds, and phosphate compounds each not being strongly basic The preferable embodiments of the insolubilizing material for a designated hazardous substance include the following embodiments:

the insolubilizing material contains 0.215 to 7.000 mol of the concomitant component relative to 1 mol of the aluminum compound;

the insolubilizing material contains the aluminum compound; and, as the concomitant components, both the calcium compound and the phosphate compound each not being strongly basic;

the aluminum compound is at least one compound selected from the group consisting of aluminum chloride, aluminum nitrate, aluminum lactate, aluminum tartarate, aluminum salicylate, aluminum sulfate, and hydrates thereof;

the calcium compound is at least one compound selected from the group consisting of calcium carbonate, calcium sulfate, hard-burned calcium oxide, calcium peroxide, calcium fluoride, calcium iodide, calcium phosphate, calcium chloride, calcium nitrate, calcium acetate, calcium citrate, calcium gluconate, calcium malate, and calcium lactate;

the phosphate compound is at least one compound selected from the group consisting of trisodium phosphate, disodium hydrogenphosphate, sodium dihydrogenphosphate, tripotassium phosphate, dipotassium hydrogenphosphate, potassium dihydrogenphosphate, calcium phosphate, and magnesium phosphate;

the magnesium compound is at least one compound selected from the group consisting of magnesium carbonate, magnesium hydroxide, magnesium sulfate, magnesium phosphate, hard-burned magnesium oxide, and magnesium acetate; and the designated hazardous substance is at least one substance selected from the group consisting of cadmium and compounds thereof, hexavalent chromium compounds, cyanides, mercury and compounds thereof (including alkyl mercury compounds), selenium and compounds thereof, lead and compounds thereof, arsenic and compounds thereof, fluorine and compounds thereof, and boron and compounds thereof.

The present invention provides, as another embodiment, a method for insolubilizing a designated hazardous substance, comprising insolubilizing the designated hazardous substance by conducting treatment to soil that needs insolubilization of the designated hazardous substance so that a pH of a treated area is kept not to reach a strongly basic region of a pH of 11 or more from start to finish by adding to the soil to mix with the soil, or spraying on the soil: a water-soluble aluminum compound not being strongly basic and not being amorphous; and at least one concomitant component selected from the group consisting of calcium compounds, magnesium compounds, and phosphate compounds each not being strongly basic in a state where the aluminum compound and the concomitant component are mixed in advance or in a state where the aluminum compound and the concomitant component are separated.

The present invention provides, as yet another embodiment, a method for insolubilizing a designated hazardous substance, comprising insolubilizing the designated hazardous substance by conducting treatment to soil that needs insolubilization of the designated hazardous substance so that a pH of a treated area is kept not to reach a strongly basic region of a pH of 11 or more from start to finish and the soil after treatment has a pH of 5.0 to 9.0 by adding to the soil to mix with the soil, or spraying on the soil: a water-soluble aluminum compound not being strongly basic and not being amorphous; and at least one concomitant component selected from the group consisting of calcium compounds, magnesium compounds, and phosphate compounds each not being strongly basic in a state where the aluminum compound and the concomitant component are mixed in advance or in a state where the aluminum compound and the concomitant component are separated.

The preferable embodiments of any one of the methods for insolubilizing a designated hazardous substance include the following embodiments:

the aluminum compound is added within a range from 25 to 300 mol relative to 1 $m^3$ of the soil; the aluminum compound is added within a range from 50 to 250 mol relative to 1 $m^3$ of the soil; the aluminum compound is added within a range from 75 to 215 mol relative to 1 $m^3$ of the soil; and the designated hazardous substance to be insolubilized originates from the soil or originates from a constituent of the insoluble material.

Advantageous Effects of Invention

According to the present invention, provided is an insolubilizing material for a designated hazardous substance (heavy metal or the like) which is used in insolubilizing treatment conducted by adding the insolubilizing material to the soil to mix with the soil or by spraying the insolubilizing material on the surface of the soil, the insolubilizing material containing, as the main component, an economical material using inexpensive raw materials that are easily available. Furthermore, according to the present invention, provided is a practically valuable insolubilizing material for a designated hazardous substance (heavy metal or the like): making it possible to conduct treatment in a neutral region to a weakly basic region from start to finish to effectively insolubilize and immobilize a heavy metal or the like which is contained in the soil and the vicinity of the surface of the soil and which has adverse effects on the health; and making it possible to make the treated matter reusable, environmentally friendly, and neutral without fail including the case where the solidifying material is used as necessary together with the insolubilizing material for a designated hazardous substance.

BRIEF DESCRIPTION OF DRAWING

FIG. 1 is a graph showing results of confirmation that insolubilization of a heavy metal or the like, which was conducted in Evaluation Test 4, is sustained.

DESCRIPTION OF EMBODIMENTS

Hereinafter, the present invention will be described in more detail giving preferable embodiments. In the process of conducting diligent studies on the problems of the conventional technologies, the present inventors have recognized that, with the conventional technologies in which the heavy metal or the like in soil is insolubilized by producing ettringite, it is difficult to keep the treated matter neutral without fail when the treated matter is used for landfill or other purposes, and the present inventors have conducted further studies based on the recognition that it is important to develop a novel insolubilizing material for a heavy metal or the like that makes it possible to make the treated matter neutral and favorable without any problem even when the treated matter is used for landfill.

Specifically, it is considered to be important to develop a technology to insolubilize the heavy metal or the like without making the soil to be treated strongly basic (pH of 11 or more) from start to finish in order to make the treated matter neutral in the first place, and therefore studies on whether the heavy metal or the like in soil can be immobilized or not using various kinds of compounds.

As a result thereof, the present inventors have reached the present invention by finding that the heavy metal or the like can be insolubilized without making the soil strongly basic during treatment by using, for treatment, an insolubilizing material containing a water-soluble aluminum compound not being strongly basic and not being amorphous and at least one concomitant component selected from the group consisting of calcium compounds, magnesium compounds, and phosphate compounds each not being strongly basic. In the process of the studies, the present inventors have found that an effect of insolubilizing the heavy metal or the like in soil in a favorable state is obtained by using an amorphous aluminum compound in the first place. However, on the other hand, the present inventors have recognized the following problem that occurs in this case. That is to say, a treatment material for use in the treatment of soil that needs a large amount of insolubilizing material is required, as its basic performance, to be the one in which more inexpensive raw materials that can be supplied by a large amount are used, but there has been a problem that the production amount of the amorphous aluminum compounds is small as compared with that of the general aluminum compounds not being amorphous. This is an extremely big problem in order to make insolubilizing materials for a heavy metal or the like industrially usable.

Thus, the present inventors have made further studies to find that even when the aluminum compound not being amorphous and being easily available is used, it is possible to insolubilize the heavy metal or the like by treating the soil so that the soil does not reach a strongly basic region of a pH of 11 or more as a result of preparing a particular constitution. According to the studies conducted by the present inventors, the treatment in which the soil does not reach a strongly basic region of a pH of 11 or more from start to finish can be made possible more surely by using an aluminum compound not being strongly basic as the aluminum compound not being amorphous. In addition, when the soil to be treated is mud having a high water content, calcined gypsum can also be used as necessary as a solidifying material separately from the calcium component as a concomitant component that is essential in the present invention, and by using the calcined gypsum as such, the treated matter is solidified while the neutral state is maintained, thereby producing the treated matter that is environmentally friendly and that has an improved handling property. The details on this point will be mentioned later.

The reason is uncertain that it becomes possible to treat, in a neutral region from start to finish, the heavy metal or the like in soil, or the heavy metal or the like that originates from a constituent of the insolubilizing material to effectively insolubilize and immobilize the heavy metal or the like by using an insolubilizing material for a designated hazardous substance according to the present invention containing: a water-soluble aluminum compound not being strongly basic and not being amorphous; and at least one concomitant component selected from the group consisting of calcium compounds, magnesium compounds, and phosphate compounds each not being strongly basic, however the present inventors consider as follows.

The present inventors have confirmed that, when a water-soluble aluminum compound not being strongly basic and not being amorphous exists in water with a calcium compound, a magnesium compound, or a phosphate compound not being strongly basic, a water-insoluble aluminum compound is produced and precipitated through the reaction of the aluminum compound with the concomitant component, but that, in such a case, when the heavy metal or the like is dissolved and present, the heavy metal or the like is also separated and precipitated. From these facts, the present inventors consider that, when the water-soluble aluminum compound which characterizes the present invention, which is not strongly basic, and which is not amorphous is added to and mixed with, or sprayed on soil such as mud, the aluminum compound dissolves in water that is contained in the soil and reacts with the calcium compound, the magnesium compound, or the phosphate compound being used with the aluminum compound and not being strongly basic to produce the insoluble aluminum compound, and when the insoluble aluminum compound is produced, an action of some sort works on the heavy metal or the like contained in soil to make a mineral with a silica component or the like that originates from the soil resulting in stabilization of the heavy metal or the like, thereby making it possible to insolubilize the heavy metal or the like. Being different from the conventionally known technology in which the heavy metal or the like in soil is insolubilized by producing ettringite as a result of treating the soil in the strongly basic region of a pH of 11 or more, an extremely big advantage of achieving insolubilization of the heavy metal or the like without making the soil strongly basic is obtained by the above-described action with the insolubilizing material according to the present invention.

That is to say, according to the present invention, it is made possible to treat soil in a neutral region from start to finish without the necessity of making the treated state into a strongly basic region of a pH of 11 or more as has been the case with the conventional technology. Specifically, by applying, on the soil, an insolubilizing material: containing a water-soluble aluminum compound not being strongly basic and not being amorphous; and any of the concomitant components selected from the group consisting of calcium compounds, magnesium compounds, and phosphate compounds each not being strongly basic, treatment in a neutral region to a weakly basic region from start to finish is conducted, thereby making it possible to prevent the elution of the heavy metal or the like from the soil. According to the studies conducted by the present inventors, more remarkable effects are obtained particularly when an insolubilizing material with the constitution containing a water-soluble aluminum compound, a calcium compound, and a phosphate compound is used among the insolubilizing materials according to the present invention. Furthermore, in the present invention, it is preferable to prepare the constitution in which gypsum that contains calcined gypsum is used as a solidifying material together with the above-described components when the soil to be an object of treatment is mud having a high water content.

Hereinafter, each material that constitutes the insolubilizing material for a designated hazardous substance according to the present invention will be described in detail.

<Aluminum Compound>

In the present invention, any aluminum compound is usable as long as it is a water-soluble aluminum compound not being strongly basic and not being amorphous. As mentioned previously, since the water-soluble aluminum compound is reacted with the calcium compound, the magnesium compound, or the phosphate compound not being strongly basic to produce a water-insoluble aluminum compound, thereby insolubilizing the heavy metal or the like in the present invention, the aluminum compound is at least required to be water-soluble. Examples of such an aluminum compound include aluminum chloride, aluminum nitrate, aluminum lactate, aluminum tartarate, aluminum salicylate, and aluminum sulfate. Any of hydrates and anhydrides of these aluminum compounds are usable.

<Concomitant Components>
(Calcium Compound)

Any calcium compound is usable as a concomitant component that constitutes the present invention as long as it is a calcium compound not being strongly basic. Specific examples of the calcium compound include calcium carbonate, calcium sulfate, hard-burned calcium oxide, calcium peroxide, calcium fluoride, calcium iodide, calcium phosphate, calcium chloride, calcium nitrate, calcium acetate, calcium citrate, calcium gluconate, calcium malate, and calcium lactate. In the present invention, it is preferable to use, among others, a calcium compound such as calcium carbonate or calcium sulfate. It is to be noted here that calcium oxide is strongly basic and is not applicable to the present invention because there is a possibility that the soil becomes strongly basic during treatment, however hard-burned calcium oxide is poor in activity, does not make the soil strongly basic, and therefore is usable in the present invention.

It is to be noted here that calcium sulfate (hereinafter, sometimes referred to as "gypsum") as a concomitant component, as will be described below, is a neutral substance, does not change pH even when used by a large amount, can maintain a treatment system in a neutral region, and therefore is useful as the concomitant component specified in the present invention. Furthermore, when calcined gypsum is used as gypsum, not only insolubilization of the heavy metal or the like can be achieved, but also solidification performance through hydration reaction of the heavy metal or the like can be imparted to the insolubilization material, and therefore another advantage of improving the handling property of the treated matter to be obtained is obtained when the soil that needs insolubilization of a designated hazardous substance is mud. It is to be noted here that, when calcium sulfate is utilized as a concomitant component, there is also an advantage that the calcium sulfate can be handled differently from other concomitant components that constitute the insolubilizing material in terms of the amount to be used. That is to say, when the gypsum is used as a solidifying material to soil having a high water content, such as mud, the amount of calcium sulfate to be used relative to the soil is so large that the amount exceeds a range that is considered to be suitable for a concomitant component, which will be mentioned later, however, also in such a case, there occurs no problem because the pH of the treatment system is not changed by the addition of calcium sulfate as described above. Moreover, the gypsum also has a function of adsorbing fluorine and so on to make the fluorine easy to immobilize, and therefore use of the gypsum is rather desirable also from the standpoint of insolubilization of a designated hazardous substance. Needless to say, when the other components specified in the present invention are used, use of the gypsum as a solidifying material for the soil such as mud is also a preferable embodiment. Hereinafter, the gypsum for use in the present invention will be described.

As described above, the gypsum is not only used as a concomitant component specified in the present invention, but also can be used as a solidifying material for improving the handling property of the treated matter to be obtained when the soil that needs insolubilization of a designated hazardous substance is mud. Particularly when the gypsum is used for the purpose of making use of a solidifying function that the gypsum has, it is preferable to use calcined gypsum that is excellent in the soil-solidifying performance at least part of the gypsum. Calcined gypsum means ½ hydrate [$CaSO_4 \cdot 1/2H_2O$] and anhydride [$CaSO_4$] of calcium sulfate, and use of the calcined gypsum makes it possible to achieve effective utilization of the solidification performance concurrently with the achievement of insolubilization of a designated hazardous substance to be an object of the present invention. That is to say, the calcined gypsum chemically reacts with water in soil to easily change into dihydrate gypsum through hydration reaction, and therefore the soil treated with the calcined gypsum solidifies to have strength, thereby making it possible to improve the handling property of the soil. Examples of the calcined gypsum include β type hemihydrate gypsum, α type hemihydrate gypsum, type III anhydrous gypsum, and mixtures thereof, and any of these types of gypsum can be used. Moreover, type II anhydrous gypsum can be used although the type II anhydrous gypsum has a slow rate of hydration when compared with other calcined gypsum. Any of natural gypsum, by-product gypsum, and waste gypsum may be used as raw material gypsum for the calcined gypsum. Among these, natural gypsum and by-product gypsum are inexpensive materials and preferable, however it is more preferable to use waste gypsum as a raw material when higher economic efficiency and effective utilization of resources are taken into consideration. It is to be noted that, according to the present invention, even when the existence of the heavy metal or the like attributable to a material itself is apprehended, such as waste gypsum, the heavy metal or the like is also immobilized in the treated matter, and therefore the utilization of waste gypsum is expected. When the gypsum is used as a solidifying material, the amount to be used thereof may appropriately be determined according to the water content of mud to be treated.

(Magnesium Compound)

The magnesium compound as a concomitant component that constitutes the present invention may be a magnesium compound not being strongly basic, and any of such magnesium compounds is usable. Specific examples include magnesium compounds such as magnesium carbonate, magnesium hydroxide, magnesium sulfate, hard-burned magnesium oxide, magnesium acetate, and magnesium phosphate. It is to be noted here that magnesium oxide is strongly basic and is not applicable to the present invention because there is a possibility that soil becomes strongly basic during treatment, however hard-burned magnesium oxide is poor in activity, does not make the soil strongly basic, and therefore is usable in the present invention.

(Phosphate Compound)

The phosphate compound as a concomitant component that constitutes the present invention may be a phosphate compound not being strongly basic, and any of such phosphate compounds is usable. Specific examples include phosphate compounds such as trisodium phosphate, disodium hydrogenphosphate, sodium dihydrogenphosphate, tripotassium phosphate, dipotassium hydrogenphosphate, potassium dihydrogenphosphate, calcium phosphate, and magnesium phosphate.

As mentioned previously, the present inventors have newly found, in advance of the present invention, that the amorphous aluminum is effective as a component of the insolubilizing material for a heavy metal or the like in soil. According to the detailed studies, the amorphous aluminum compound is excellent in performance of adsorbing the heavy metal or the like when compared with the (crystalline) aluminum compound not being amorphous, and the amorphous aluminum compound, when added into the soil or to the surface of the soil, easily adsorbs the heavy metal or the like contained in soil and on the surface of the soil, or contained in the insolubilizing material itself, and furthermore the amorphous aluminum compound takes in the adsorbed heavy metal or the like, and silica components and calcium components contained in the soil to become a mineral during a process in which the amorphous aluminum compound changes into the crystalline aluminum compound in the soil, resulting in achievement of stable insolubilization of the heavy metal or the like.

However, as mentioned previously, since the production amount of the amorphous aluminum compounds is small as compared with that of the general aluminum compounds not being amorphous, it is hard to say that the amorphous aluminum compound is suitable for a material for use in the treatment of the soil that needs a large amount of treatment material in putting the amorphous aluminum compound into practical use. Thus, the present inventors have conducted further studies to find the constitution that is capable of insolubilizing, in a favorable state, the heavy metal or the like that is contained in soil by making use of the water-soluble aluminum compound that is easily available, that is not strongly basic, and that is not amorphous, and have reached the present invention. That is to say, the insolubilizing material according to the present invention is more useful from the practical point of view because the materials used therein are easily available.

The reason is uncertain that the heavy metal or the like in soil can be stably insolubilized by using the insolubilizing material for a designated hazardous substance according to the present invention, constituted so as to contain the components given above, such as the aluminum compound not being amorphous, however, as mentioned previously, the present inventors consider the reason as described below. According to the detailed studies conducted by the present inventors, it is considered that, the water-soluble aluminum compound not being strongly basic and not being amorphous (namely, crystalline aluminum compound) among the aluminum compounds, when added to soil or on the surface of the soil together with a component selected from the group consisting of calcium compounds, magnesium compounds, and phosphate compounds each not being strongly basic, forms a water-insoluble aluminum compound. And in forming the water-insoluble aluminum compound, the heavy metal or the like that is contained in the soil and on the surface of the soil, or contained in the insolubilizing material itself also becomes a mineral from the reason of some kind with the compound formed as described above and silica components contained in the soil, and, as a result thereof, the heavy metal or the like can stably be insolubilized. That is to say, it is considered that use of the water-soluble aluminum compound which characterizes the present invention, which is not strongly basic, and which is not amorphous together with any of the concomitant components of calcium compounds, magnesium compounds, and phosphate compounds each not being strongly basic makes it possible to insolubilize designated hazardous substances contained in the soil, including, for example, heavy metals such as arsenic, selenium, cadmium, mercury, cyanogen, lead, and hexavalent chromium and inorganic substances such as fluorine and boron and stably immobilize these designated hazardous substances.

The present inventors have mixed the aluminum compound specified in the present invention, the concomitant component or components, and soil so that the soil does not reach a strongly basic region of a pH of 11 or more and cured the resultant mixture, and have conducted researches on the properties of the treated matter after curing in order to confirm that the effects obtained by conducting treatment using the water-soluble aluminum compound not being strongly basic and not being amorphous and the concomitant component or components. As a result thereof, the remarkable effects of the present invention were able to be confirmed by conducting the elution test as will be mentioned later. The details will be mentioned later. The insolubilizing material according to the present invention can effectively be used by adding to and mixing with the soil, however the remarkable effects of the present invention are obtained also by spraying the insoluble material on the vicinity of the surface of the soil, and therefore simpler treatment is made possible by such usage.

The insolubilizing material for a designated hazardous substance according to the present invention is required to contain: a water-soluble aluminum compound being not strongly basic and not being amorphous; and any of the concomitant components of calcium compounds, magnesium compounds, and phosphate compounds each not being strongly basic, and although the optimum range of the amount of the concomitant component is different depending on the kind, it is preferable to set in the following range according to the studies conducted by the present inventors. The insolubilizing material that contains the concomitant component in a range from 0.215 to 7.000 mol relative to 1 mol of the aluminum compound, and, furthermore, the insolubilizing material that contains the concomitant component in a range from 0.334 to 4.500 mol are preferable. The reason is as follows.

When aluminum sulfate and trisodium phosphate are used for example, the following reaction occurs as will also be shown in Examples.

$$Al_2(SO_4)_3 + 2Na_3PO_4 = 2AlPO_4(\text{insoluble} \downarrow) + 3Na_2SO_4$$

In the reaction, blending 2 mol of the phosphate compound relative to 1 mol of the aluminum compound is considered to be theoretically optimum. However, according to the studies conducted by the present inventors, as will be mentioned later, when the insolubilizing material consisting of the combination of aluminum sulfate and trisodium phosphate is applied to the actual soil, it has been found out that the insolubilizing material preferably contains 0.857 (0.429 times the theoretical value) to 4.667 (2.334 times the theoretical value) mol of the phosphate compound relative to 1 mol of the aluminum compound, more preferably 1.333 (0.667 times the theoretical value) to 3.000 (1.500 times the theoretical values) mol. This shows that use of the concomitant component in a range from about 0.429 to about 2.334 times the theoretical value relative to 1 mol of the aluminum compound, more preferably from about 0.667 to about 1.500 times the theoretical value gives the insolubilizing material with which the effects of the present invention can be obtained.

It is to be noted here that, when the insolubilizing material is constituted using the aluminum compound, and the calcium compound, the magnesium compound, or the phosphate compound as specified in the present invention, blending the calcium compound, the magnesium compound, or the phosphate compound by 0.5 (in the case of, for example, the combination of aluminum chloride and calcium phosphate) to 3.0 (in the case of, for example, the combination of aluminum sulfate and calcium carbonate) mol relative to 1 mol of the aluminum compound is considered to be theoretically optimum, although the amount depends on the kind of the compound to be used. However, according to the studies conducted by the present inventors, it has been found that, in the case of applying the insolubilizing material to the actual soil, the effects of the present invention are more stably obtained when the insolubilizing material is constituted so as to contain the concomitant component within a range from 0.429 to 2.334 times the theoretical value, namely within a range from 0.215 to 7.000 mol, more preferably 0.667 to 1.500 times the theoretical value, namely within a range from 0.334 to 4.500 mol as described above.

When the insolubilizing material is added to and mixed with the soil to conduct the insolubilization method according to the present invention, an appropriate amount of water may be added to the soil as necessary in order to make the mixing operation easy. The aluminum compound is, in general, an amphoteric compound and is easily soluble to an acid and a base, and therefore it is preferable to constitute the insolubilizing material so that the pH of the treated soil (treated matter) may be in a range from 5.0 to 9.0 in order to more easily produce and precipitate the insoluble aluminum compound during treatment. Moreover, it is more preferable to constitute the insolubilizing material so that the pH of the treated soil may be in a range from 5.6 to 8.6 taking into consideration the fact that the treated matter is utilized for landfill and the like after treatment. The insolubilizing material according to the present invention makes it possible to achieve the pH value within the above-described preferable range in the treated matter without particularly adjusting the pH after treatment because any of the components is not strongly basic including the case where gypsum is used as a solidifying material as necessary.

EXAMPLES

Next, the present invention will be described in more specifically giving Examples and Comparative Examples. First of all, the test methods used will be described. Each test that was used for verifying the effects and so on was conducted according to the following method.

[Each Test Method Used]

(1) Test for Water Content: The water content w (%) was calculated by the following equation in accordance with "Test Method for Water Content of Soils JIS A1203".

$$W = (m_a - m_b) \times 100 / (m_b - m_c)$$

$m_a$: mass of sample and vessel (g)
$m_b$: mass of furnace-dried sample and vessel (g)
$m_c$: mass of vessel (g)

(2) Elution Test of the Ministry of Environment Notification No. 46 (1991) (hereinafter also referred to as "No. 46 test"

Soil to be an object was dried, and passed through a 2 mm sieve, then, water whose pH was adjusted to 5.6 to 6.3 was used as a solvent, and 10 times the amount of the water relative to the dried soil that was passed through the sieve was added to prepare a test sample. The test sample was shaken at 200 times/min with a shaking width of 4 to 5 cm for 6 hours continuously. Thereafter, centrifugal separation and filtration were conducted, and then the obtained filtrate was used as a sample for measurement. Metal analysis in the sample was conducted in accordance with the methods for respective metals standardized by JIS.

(3) pH Test:

pH was measured by the following procedures in accordance with "The Method for pH of Suspended Soils JGS0211"

A sample was placed in a beaker, and water was added so that the mass ratio of water (including water in the sample) to the dried mass of the sample became 5. The sample was suspended with a stirring rod and was left still for 30 minutes or more and 3 hours or less to prepare a sample solution for measurement. The pH was measured by a glass electrode pH meter after the sample solution in the beaker was stirred.

[Preparation of Simulated Contaminated Soil for Evaluation]

Soil that was dried until the weight became constant in a drying furnace at 110° C.±5° C. was prepared. And each of fluorine and lead was separately added to the soil to prepare simulated contaminated soils so that the amount of fluorine eluted was 6.0 mg/L and the amount of lead eluted was 100 mg/100 mL.

[Evaluation on Insolubilization of Heavy Metal or the Like]

The water content of 1 kg of the simulated contaminated soil was adjusted to 40%, each compound of a Ca-based compound, an Mg-based compound, and a phosphate-based compound was appropriately used with an aluminum compound, a constant amount of each compound was separately added to the prepared soils to conduct treatment of mixing and kneading, and tests were conducted on whether the heavy metal or the like contained in the simulated contaminated soils used was insolubilized or not for the obtained treated matters. Specifically, either aluminum sulfate octadecahydrate, aluminum chloride, or aluminum nitrate was used as the aluminum compound (Al-based compound). Moreover, regarding the compound that was used together with the aluminum compound, calcium carbonate, hard-burned calcium oxide, or calcium sulfate was used as the calcium compound (Ca-based compound), hard-burned magnesium oxide or magnesium sulfate was used as the magnesium compound (Mg-based compound), and either trisodium phosphate, sodium dihydrogenphosphate, or tripotassium phosphate was used as the phosphate compound (phosphate-based compound). The amount to be added can appropriately be adjusted for each compound depending on the properties and molecular weight.

(Evaluation Test 1: Test Results on Insolubilization of Fluorine-1)

The combinations of compounds shown in Table 1 were used to the simulated contaminated soils in which the amount of fluorine eluted was adjusted to 6.0 mg/L, and 5% by mass of the aluminum compound, 2% by mass of each of hard-burned calcium oxide and hard-burned magnesium, and 5% mass of the other compounds were added to the soils to conduct treatment of mixing and stirring. And test samples for obtained treated matters were prepared by the aforementioned method, and the amount of fluorine in each of the samples for measurement was measured to evaluate on whether the fluorine was insolubilized or not.

And the treatments that are examples according to the present invention are shown as No. 1-1 to 1-9 in Table 1. For the sake of comparison, the result obtained when the same treatment was conducted except that none of the compounds was added is shown as Comparative Example 1-1, and the result obtained when the same treatment was conducted except that only aluminum sulfate which is the same as used in No. 1-1 to 1-6 in Examples was added is shown as Comparative Example 1-2.

In each of the Examples and the Comparative Examples, the pH of each soil immediately after mixing and stirring and the pH of each soil at the time of conducting the elution test after treatment were measured together by the aforementioned method. The obtained results are shown together in Table 1. Moreover, the fluorine concentration was measured by ionic electrometry. As a result thereof, as shown in Table 1, it was confirmed that the elution of fluorine eluted was able to be clearly more reduced by the treatments in Examples than by the treatments in Comparative Examples. In addition, when the extraction test with a strong acid was conducted using the produced solidified matter of the heavy metal or the like for each Example, it was confirmed that fluorine was contained in the solidified matter. Moreover, any of the pH of the soil after treatment was in the vicinity of 7 in the case of treatments in Examples. On the other hand, the pH of the sample for the elution test was on the acid side of a pH of less than 5.0 in Comparative Example 1-2 due to an influence of added aluminum sulfate octadecahydrate. And it is considered that the acidic pH caused an increase of the amount of fluorine eluted when compared with Comparative Example 1-1 where the treatment was conducted without adding any compound. This indicates that it is extremely important to prevent the pH of a treatment system from entering the acidic side of a pH of less than 5.0 in the present invention.

TABLE 1

Test Results on Insolubilization of Fluorine-1

| No. | Al-based compound | Ca-based compound | Mg-based compound | Phosphate-based compound | pH Immediately after mixing and stirring | pH 1 day after treatment | Amount of fluorine eluted (mg/L) |
|---|---|---|---|---|---|---|---|
| Example 1-1 | Aluminum sulfate 5% by mass | Calcium carbonate 5% by mass | | | 7.37 | 7.21 | 0.66 |
| Example 1-2 | Aluminum sulfate 5% by mass | Hard-burned calcium oxide 2% by mass | | | 8.85 | 8.33 | 1.23 |
| Example 1-3 | Aluminum sulfate 5% by mass | | Hard-burned magnesium oxide 2% by mass | | 7.01 | 6.92 | 0.85 |
| Example 1-4 | Aluminum sulfate 5% by mass | | | Trisodium phosphate 5% by mass | 7.13 | 7.04 | 0.68 |

TABLE 1-continued

Test Results on Insolubilization of Fluorine-1

| | | | | | pH | | |
|---|---|---|---|---|---|---|---|
| | | | | | Immediately after mixing and stirring | 1 day after treatment | Amount of fluorine eluted (mg/L) |
| Example 1-5 | Aluminum sulfate 5% by mass | | | Sodium dihydrogenphosphate 5% by mass | 7.28 | 7.09 | 1.21 |
| Example 1-6 | Aluminum sulfate 5% by mass | Calcium sulfate 2.5% by mass | | Sodium dihydrogenphosphate 2.5% by mass | 7.26 | 7.10 | 1.13 |
| Example 1-7 | Aluminum chloride 5% by mass | | | Tripotassium phosphate 5% by mass | 7.41 | 7.17 | 0.50 |
| Example 1-8 | Aluminum chloride 5% by mass | Calcium carbonate 5% by mass | | | 7.18 | 7.45 | 1.71 |
| Example 1-9 | Aluminum nitrate 5% by mass | | Magnesium sulfate 5% by mass | | 7.37 | 7.33 | 1.51 |

| | Kinds and amounts of compounds added | | | | pH | | Amount of fluorine eluted (mg/L) |
|---|---|---|---|---|---|---|---|
| No. | Al compound | Ca compound | Mg compound | Phosphate compound | Immediately after mixing and stirring | 1 day after treatment | |
| Comparative Example 1-1 | — | — | — | — | 7.55 | 7.34 | 6.00 |
| Comparative Example 1-2 | Aluminum sulfate 5% by mass | | | | 4.75 | 4.85 | 9.83 |

(Evaluation Test 2: Test Results on Insolubilization of Fluorine-2)

Studies were conducted on the adequate molar ratio of the aluminum compound and the calcium compound, magnesium compound, or phosphate compound being a concomitant component with the aluminum compound using, as a representative example, the combination of the aluminum compound (aluminum sulfate octadecahydrate) and the phosphate compound (trisodium phosphate). Specifically, each composition (mol) of aluminum sulfate octadecahydrate and trisodium phosphate shown in Table 2 was added to conduct treatment to the simulated contaminated soil which was used in Evaluation Test-1 and in which the amount of fluorine eluted was adjusted to 6.0 mg/L. Specifically, as shown in Table 2, five kinds of insolubilizing materials of Examples 2-1 to 2-5 were used to conduct treatment in which the molar ratios of trisodium phosphate to 1 mol of aluminum sulfate octadecahydrate were changed from 0.857 mol to 4.667 mol.

Then, the aforementioned Elution Test of the Ministry of Environment Notification No. 46 (1991) was conducted for the obtained treated matters after treatment in the same manner as in Evaluation Test-1, the pH of the adjusted samples for measurement was measured by a glass electrode method, and the fluorine concentration in the samples was measured by ionic electrometry. More specifically, Evaluation Test-2 was conducted by adjusting the molar ratios of the aluminum and phosphoric acid to be as shown in the following Table 2, and also adjusting the total amount of aluminum sulfate octadecahydrate and trisodium phosphate to be 10% by mass relative to the simulated contaminated soil. Moreover, the pH of the soil at the time of conducting the elution test after treatment was also measured by the aforementioned method. The test conditions and the obtained results are shown in Table 2 as Examples 2-1 to 2-5 and Comparative Examples 2-1 to 2-3. As shown in Table 2, the amount of fluorine eluted was able to be clearly reduced in the cases of the treatments in Examples as compared with the treatments in Comparative Examples. Moreover, any of the soil after treatment was stably in the vicinity of 7.

TABLE 2

Test Results on Insolubilization of Fluorine-2

| No. | Aluminum sulfate octadecahydrate (mol) | Trisodium phosphate (mol) | pH | Amount of fluorine eluted (mg/L) |
|---|---|---|---|---|
| Comparative Example 2-1 | — | — | 7.23 | 6.00 |
| Comparative Example 2-2 | 1 | 0 | 4.01 | 10.84 |
| Comparative Example 2-3 | 0 | 1 | 8.91 | 1.82 |
| Example 2-1 | 1 | 0.857 | 6.84 | 1.06 |
| Example 2-2 | 1 | 1.333 | 6.94 | 0.95 |
| Example 2-3 | 1 | 2.000 | 7.12 | 0.68 |
| Example 2-4 | 1 | 3.000 | 7.35 | 0.73 |
| Example 2-5 | 1 | 4.667 | 7.47 | 1.08 |

As in the test that was conducted above, when the treatment was conducted using aluminum sulfate octadecahydrate and trisodium phosphate, it is anticipated that the following reaction occurs to produce aluminum phosphate. Furthermore, it is considered that the heavy metal or the like represented by fluorine contained in soil was also taken in the mineral together with aluminum phosphate resulting in insolubilization. In addition, it was confirmed that, also in the above-described Examples, fluorine was present in the produced solidified matters of the heavy metal or the like by conducting elution tests.

$$Al_2(SO_4)_3 + 2Na_3PO_4 = 2AlPO_4(\text{Insoluble} \downarrow) + 3Na_2SO_4$$

In addition, the pH of the sample for elution test was on the acidic side of a pH of 4.01 in Comparative Example 2-2 due to an influence of added aluminum sulfate octadehydrate as in Comparative Example 1-2 shown previously, and it is considered that the acidic pH caused an increase of the amount of fluorine eluted.

(Evaluation Test 3: Test Results on Insolubilization of Lead)

Each of insolubilizing materials of Examples and Comparative Examples was added in a predetermined amount to the aforementioned simulated soil in which the amount of lead eluted was adjusted to 100 mg/100 mL, and then insolubilizing treatment was conducted to each soil by sufficiently mixing the resultant mixture. After the treatment, the obtained treated matters were cured for 1 day, thereafter the elution test was conducted to the obtained treated matters by the aforementioned method, the lead concentrations in the prepared samples for measurement were measured to obtain the amounts of lead eluted from the soil of the treated matters, and the results are shown in Table 3. In the insolubilizing materials used for the test, the total amount of the aluminum compound and the calcium compound, magnesium compound, or the phosphate-based compound at the time of adding the insolubilizing materials was adjusted to 1% by mass relative to the soil to be an object of treatment, and the amount of calcium, magnesium, or phosphoric acid relative to aluminum constituting the insolubilizing materials was adjusted to 1:1 in terms of a molar ratio. In addition, it was confirmed that, in Examples, lead was contained in the solidified matters by conducting extraction tests with a strong acid using produced solidified matters of the heavy metal or the like.

TABLE 3

Test Results on Insolubilization of Lead

| No. | Aluminum sulfate (mol) | Calcium carbonate (mol) | Magnesium sulfate (mol) | Trisodium phosphate (mol) | Amount of lead eluted (mg/100 mL) |
|---|---|---|---|---|---|
| Comparative Example 3 | — | — | — | — | 100 |
| Example 3-1 | 1 | 1 | | | 1.9 |
| Example 3-2 | 1 | | 1 | | 3.2 |
| Example 3-3 | 1 | | | 1 | <0.01 |

As shown in Table 3, any of the insolubilizing materials of Examples 3-1 to 3-3 clearly exhibited the effect of insolubilizing lead contained in soil. As shown in Table 3, it was confirmed that extremely high insolubilization effect was exhibited also for lead.

(Evaluation Test 4: Results of Long Term Stability Test on Insolubilization of Fluorine)

A test was conducted in which the simulated contaminated soil in which the amount of fluorine eluted was adjusted to 6.0 mg/L was used, aluminum sulfate octadecahydrate and trisodium phosphate were added thereto so as to be 1% by mass relative to the simulated contaminated soil to conduct treatment of mixing and stirring, and the treated matter was cured for 30 days. Samples were collected from the obtained treated matter at each stage of curing, and the aforementioned elution test was conducted for each collected sample to measure the amount of fluorine in each of the obtained samples for measurement. Specifically, in the process of the treated matter at each stage of the first day, seven days, 10 days, and 30 days. In the process of the above-described test, samples were collected from the treated matter at each stage of the first day, 7th day, 10th day, and 30th day, and the elution test was conducted using these collected samples to measure the amounts of fluorine in the samples for measurement. The results are shown in Table 4 and FIG. 1.

TABLE 4

Results of Long Term Stabilization Test on Insolubilization of Fluorine - Comparison in Terms of Amount of Fluorine Eluted (mg/L)

| | Curing (days) | | | |
|---|---|---|---|---|
| | 0 | 7 | 10 | 30 |
| Simulated contaminated soil as object of treatment | 6 | 6 | 6 | 6 |
| Treatment with aluminum sulfate and trisodium phosphate | 1.58 | 1.1 | 0.8 | 0.5 |

As shown in Table 4, it was able to be confirmed that the effect of insolubilizing fluorine contained in soil was clearly obtained from the insolubilizing material according to the present invention and that not only the effect was initially obtained but also the insolubilization progressed thereafter.

(Evaluation Test 5: Results of Studies on Range of Proper Amount of Insolubilizing Material)

Studies on the amount of the insolubilizing material to be added per 1 $m^3$ of soil were conducted by the following procedures to make clear a range of the proper amount of the insolubilizing material.

<Test Method>

An insolubilizing material constituted from the combination of aluminum sulfate octadecahydrate and trisodium phosphate was used as a representative example, and the elution test was conducted after conducting treatment in which the amount of the insolubilizing material added relative to 1 $m^3$ of the simulated contaminated soil used in Evaluation Test 1 was changed. Specifically, first of all, the molar ratio of aluminum sulfate octadecahydrate to trisodium phosphate was set to be constant at 1:2 relative to 1 $m^3$ of the simulated contaminated soil in which the amount of fluorine eluted was adjusted to 6.0 mg/L, which is the same as the soil used in Evaluation Test 1, and the amount added was gradually increased as shown in Table 5 to conduct each treatment. After treatment, the aforementioned Elution Test of the Ministry of Environment Notification No. 46 was conducted for the obtained treated matters in the same manner as conducted in Evaluation Test 1, the pH of the prepared samples for measurement and the fluorine concentration in the samples were measured by a glass electrode method and ionic electrometry respectively. Evaluation was conducted according to the following criteria using the obtained measurement values of the fluorine concentration. The obtained results are shown in Table 5.

(Evaluation Criteria)

Excellent: amount of fluorine eluted of lower than 0.8 mg/L (environmental standard value)

Good: amount of fluorine eluted of 0.8 mg/L or higher and lower than 1.6 mg/L (twice the environmental standard value)

Fair: amount of fluorine eluted of 1.6 mg/L or higher and lower than 3.0 mg/L

Poor: amount of fluorine eluted of 3.0 mg/L or higher

TABLE 5

Amounts of Insolubilizing Materials Added and Evaluation Results

| | Aluminum sulfate octadecahydrate (mol) | Trisodium phosphate (mol) | pH | Amount of fluorine eluted (mg/L) | Evaluation |
|---|---|---|---|---|---|
| Comparative Example 5-1 | 0 | 0 | 7.75 | 6.00 | Poor |
| Example 5-1 | 25 | 50 | 7.66 | 2.50 | Fair |

TABLE 5-continued

Amounts of Insolubilizing Materials Added and Evaluation Results

|  | Aluminum sulfate octadecahydrate (mol) | Trisodium phosphate (mol) | pH | Amount of fluorine eluted (mg/L) | Evaluation |
|---|---|---|---|---|---|
| Example 5-2 | 50 | 100 | 7.35 | 0.98 | Good |
| Example 5-3 | 75 | 150 | 7.25 | 0.67 | Excellent |
| Example 5-4 | 215 | 430 | 6.64 | 0.62 | Excellent |
| Example 5-5 | 250 | 500 | 5.77 | 1.28 | Good |
| Example 5-6 | 300 | 600 | 5.09 | 1.94 | Fair |

As shown in Table 5, it was able to be confirmed that the effect of insolubilizing fluorine was exhibited within a range of 25 to 300 mol of aluminum sulfate octadecahydrate relative to 1 $m^3$ of soil on the assumption that a phosphate compound was used together. Moreover, it was confirmed that more favorable effect was obtained by adding aluminum sulfate octadecahydrate to the soil more preferably within a range of 50 to 250 mol, further preferably within a range of 75 to 215 mol. In addition, the reason that the amount of fluorine eluted was increased in the treatment systems of Example 5-6 where a large amount of insolubilizing material relative to soil was used is considered to be due the fact that the pH of the treatment system was on a more acidic side as compared with the pH in other Examples. Also from this fact, it was confirmed that it was extremely important to prevent the pH of a treatment system from entering the acidic side of a pH of less than 5.0 in the present invention. Accordingly, as the aluminum compound and concomitant component that constitute the insolubilizing material, it is effective to use an aluminum compound and a concomitant component with which the pH of a treatment system never enters the acidic side of a pH of less than 5 even if these compound and component are used in a large amount.

The invention claimed is:

1. A method for insolubilizing fluorine, or a compound thereof, or a combination thereof, as a designated hazardous substance, in soil, comprising:
treating with an insolubilizing material, the soil including fluorine, or a compound thereof, or a combination thereof, maintaining pH of a treated area of the soil in a range of lower than pH 11 from start to finish of the treating,
wherein the soil is treated with the insolubilizing material by adding the insolubilizing material to the soil and mixing the insolubilizing material with the soil, or spraying the insolubilizing material on the soil,
the insolubilizing material comprises:
a water-soluble aluminum compound; and
a concomitant component,
the water-soluble aluminum compound is not amorphous,
the water-soluble aluminum compound is at least one compound selected from the group consisting of aluminum chloride, aluminum nitrate, aluminum lactate, aluminum tartarate, aluminum salicylate, and hydrates thereof, and hydrates of aluminum sulfate,
the concomitant component is at least one compound selected from the group consisting of calcium compounds, magnesium compounds, and phosphate compounds,
the insolubilizing material does not comprise a strongly basic component, and
the water-soluble aluminum compound and the concomitant component are mixed prior to the treating, or the water-soluble aluminum compound and the concomitant component are added to the soil separately.

2. A method for insolubilizing fluorine, or a compound thereof, or a combination thereof, as a designated hazardous substance, in soil comprising:
treating with an insolubilizing material, the soil including fluorine, or a compound thereof, or a combination thereof, maintaining pH of a treated area of the soil in a range of lower than pH 11 from start to finish of the treating,
wherein the soil is treated with the insolubilizing material by adding the insolubilizing material to the soil and mixing the insolubilizing material with the soil, or spraying the insolubilizing material on the soil,
after the treating, the soil has pH in a range from 5.0 to 9.0,
the insolubilizing material comprises:
a water-soluble aluminum compound; and
a concomitant component,
the water-soluble aluminum compound is not amorphous,
the water-soluble aluminum compound is at least one compound selected from the group consisting of aluminum chloride, aluminum nitrate, aluminum lactate, aluminum tartarate, aluminum salicylate, and hydrates thereof, and hydrates of aluminum sulfate,
the concomitant component is at least one compound selected from the group consisting of calcium compounds, magnesium compounds, and phosphate compounds,
the insolubilizing material does not comprise a strongly basic component, and
the water-soluble aluminum compound and the concomitant component are mixed prior to the treating, or the water-soluble aluminum compound and the concomitant component are added to the soil separately.

3. The method according to claim 1, wherein the water-soluble aluminum compound is added in an amount in a range from 25 to 300 mol relative to 1$m^3$ of the soil.

4. The method according to claim 1, wherein the water-soluble aluminum compound is added in an amount in a range from 50 to 250 mol 3 relative to 1$m_3$ of the soil.

5. The method according to claim 1, wherein the water-soluble aluminum compound is added in an amount in a range from 75 to 215 mol relative to 1$m^3$ of the soil.

6. The method according to claim 1, wherein the concomitant component comprises the calcium compound, which is at least one compound selected from the group consisting of calcium sulfate, hard-burned calcium oxide, calcium peroxide, calcium fluoride, calcium iodide, calcium phosphate, calcium chloride, calcium nitrate, calcium acetate, calcium citrate, calcium gluconate, calcium malate, and calcium lactate.

7. The method according to claim 1, wherein the concomitant component comprises the phosphate compound, which is at least one compound selected from the group consisting of trisodium phosphate, disodium hydrogenphosphate, sodium dihydrogenphosphate, tripotassium phosphate, potassium dihydrogenphosphate, dipotassium hydrogenphosphate, calcium phosphate, and magnesium phosphate.

8. The method according to claim 1, wherein the concomitant component comprises the magnesium compound, which is at least one compound selected from the group consisting of magnesium carbonate, magnesium sulfate, magnesium phosphate, hard-burned magnesium oxide, and magnesium acetate.

9. The method according to claim 2, wherein the concomitant component comprises the calcium compound, which is at least one compound selected from the group consisting of calcium sulfate, hard-burned calcium oxide, calcium peroxide, calcium fluoride, calcium iodide, calcium phosphate, calcium chloride, calcium nitrate, calcium acetate, calcium citrate, calcium gluconate, calcium malate, and calcium lactate.

10. The method according to claim 2, wherein the concomitant component comprises the phosphate compound, which is at least one compound selected from the group consisting of trisodium phosphate, disodium hydrogenphosphate, sodium dihydrogenphosphate, tripotassium phosphate, potassium dihydrogenphosphate, dipotassium hydrogenphosphate, calcium phosphate, and magnesium phosphate.

11. The method according to claim 2, wherein the concomitant component comprises the magnesium compound, which is at least one compound selected from the group consisting of magnesium carbonate, magnesium sulfate, magnesium phosphate, hard-burned magnesium oxide, and magnesium acetate.

\* \* \* \* \*